(12) United States Patent
Sanchez-Prieto Aler et al.

(10) Patent No.: US 8,498,777 B2
(45) Date of Patent: Jul. 30, 2013

(54) SYSTEM FOR MONITORING THE STATUS AND DRIVING OF A VEHICLE

(75) Inventors: Enrique Sanchez-Prieto Aler, Torrejon de Ardoz (ES); Nilo Garcia Manchado, Torrejon de Ardoz (ES)

(73) Assignee: Crambo, S.A., Torrejon de Ardoz (ES)

( * ) Notice: Subject to any disclaimer, the term of this patent is extended or adjusted under 35 U.S.C. 154(b) by 309 days.

(21) Appl. No.: 12/918,219

(22) PCT Filed: Feb. 18, 2009

(86) PCT No.: PCT/ES2009/000091
§ 371 (c)(1),
(2), (4) Date: Oct. 6, 2010

(87) PCT Pub. No.: WO2009/103833
PCT Pub. Date: Aug. 27, 2009

(65) Prior Publication Data
US 2011/0022263 A1    Jan. 27, 2011

(30) Foreign Application Priority Data

Feb. 18, 2008   (ES) .................................. 200800438

(51) Int. Cl.
G07C 5/08 (2006.01)
B60W 40/08 (2006.01)
(52) U.S. Cl.
USPC ......... 701/33.4; 701/29.1; 701/34.4; 340/988
(58) Field of Classification Search
USPC .................................... 701/35, 29.1; 340/988
See application file for complete search history.

(56) References Cited

U.S. PATENT DOCUMENTS

| 5,410,304 | A  | * | 4/1995  | Hahn et al. ..................... 340/903 |
| 5,550,738 | A  |   | 8/1996  | Bailey et al. |
| 5,805,079 | A  |   | 9/1998  | Lemelson |
| 6,466,134 | B1 | * | 10/2002 | Ahearn ......................... 340/683 |
| 6,580,973 | B2 | * | 6/2003  | Leivian et al. .................... 701/1 |
| 2002/0151297 | A1 | * | 10/2002 | Remboski et al. ............ 455/414 |
| 2007/0040705 | A1 | * | 2/2007  | Yoshioka et al. ............. 340/988 |

FOREIGN PATENT DOCUMENTS

| FR | 2723229 A1 | 2/1996 |
| JP | 2005254847 A | 9/2005 |

\* cited by examiner

Primary Examiner — Tan Q Nguyen
(74) Attorney, Agent, or Firm — Arent Fox LLP

(57) ABSTRACT

System for monitoring the status and driving of a vehicle that consists of at least the following:
(i) a first adjustable means for detecting vibrations (2) and a first element for adjusting the sensitivity of the vibrating means (5), where this first adjusting element (5) is configured for adapting the system to different types of vibrations, controlling the operation of the first adjustment means (2);
(ii) a second adjustable means for timing (3) and a second element for adjusting the sensitivity of the timing means (4), where this second adjusting element (4) is configured for determining the system waiting period between vibrations and lack of vibrations, controlling the operation of the second adjustment means (2); and
(iii) a third means for detecting the type of driving (10) that has been configured, at least, to know the nominal status of the vehicle and the status of the vehicle in motion.

8 Claims, 1 Drawing Sheet

SYSTEM FOR MONITORING THE STATUS AND DRIVING OF A VEHICLE

CROSS-REFERENCE TO RELATED APPLICATION

This application is a National Stage entry of International Application No. PCT/ES2009/000091, filed Feb. 18, 2009, which claims priority to Spanish Application No. P200800438, filed Feb. 18, 2008, the disclosure of the prior application is hereby incorporated in its entirety by reference.

The purpose of this invention is a system for monitoring vehicles without needing any cabling or external connection for powering the system, which also includes means for communicating the aforementioned monitoring to the driver as well as to third parties.

BACKGROUND OF THE INVENTION

Currently, no device exists that is able to detect the vehicle or machine when the engine is running without needing to connect a sensor to the cable or output that is carrying the current and which almost all vehicles or machines possess. In a vehicle, for example, it is known as ignition or start up circuit. On the other hand, many systems exist that require knowing if a vehicle is turned on in order to operate in a specific way, and since the ignition or start up cable is normally located in a very specific location in the vehicle, a complicated procedure is required for installing the system. An example of these are the monitoring systems for vehicles or management of fleets, where the start-up is a useful piece of information but is not available like for example, the trailer on a truck.

In the case of trucks with a trailer, a system like the one described in this patent is useful because in many cases, knowing the status of the trailer (and therefore of the shipment) is more important than knowing the status of the truck itself. The current solution to this problem consists in installing two devices or installing only one device in the trailer and routing a cable from the cabin to the device, which is a solution that in many cases is not feasible.

The same thing occurs for the power connection; although it is usually available in many parts of the vehicle or machine, the connection to these cables in some cases complicates the installation, like in the case of trucks with ADR systems, which cut the power to the entire vehicle when these vehicles come to a complete stop.

A second aspect, not reflected in the current state of the art within the systems for monitoring the status and/or driving of a vehicle, is the absence of an own means for detecting the type of driving (aggressive or not) that is being performed by the operator. This information can be provided to the driver in a manner that will enable him to modify his driving so he can little by little learn to drive in a smoother fashion.

DESCRIPTION OF THE INVENTION

In order to find or, if warranted, eliminate the above mentioned problems, a system that monitors the status and driving of a vehicle is introduced, which includes a method to help improve driving and a safety system that will stop the vehicle when necessary.

This system includes at least:
(i) a first adjustable means for detecting vibrations and a first element for adjusting the sensitivity of the vibrating means, where this first adjusting element is configured for adapting the system to different types of vibrations, controlling the operation of the first adjustment means;
(ii) a second adjustable means for timing and a second element for adjusting the sensitivity of the timing means, where this second adjusting element is configured for determining the system waiting period between vibrations and lack of vibrations, controlling the operation of the second adjustment means; and
(iii) a third means for detecting the type of driving that has been configured, at least, to know the status of the vehicle under normal operation and while it is in motion;
where a third means for signal processing are connected with the first, second and third means and the first and second adjustment elements and at the same time are configured for adjusting the operation of said means;
and where said means are configured so that:
in case of starting a vehicle, the vibration detection means detect these vibrations, triggering the time frame configured in the second means for adjusting the timing, and where once this time has elapsed, the processing means acknowledge that the vehicle has been started;
with the engine running, in the signal processing means, parallel to this, the signals originating from the means for diagnosing the type of driving are analyzed in such a way that, combining the information from said means with the vehicle's normal speed and acceleration characteristics, we can know the level of hazard associated with the driving in accordance with predefined limits;
if the vehicle stops, the vehicle will stop vibrating and the timing means will wait the time configured by the time regulator and will then tell the processing means that the engine is shutdown.

As an option, the system will include a GPS signal input connected to the means for processing the signal, in a way that will determine if the vehicle is moving.

The system may also include means for providing electrical power that may vary depending on the type of vehicle or machine where the system is installed; these electrical power provision means may be selected among the following:
photovoltaic cells;
wind generator;
use of vibrations by electromagnetic generation (faraday's law).

The means for diagnosing the type of driving also include:
(i) means for detecting lateral movements;
(ii) means for detecting longitudinal movements;
(iii) means for measuring the acceleration configured for detecting abrupt movements of the system or an erroneous operation of the vehicle or machine;
(iv) means for measuring the speed;
(v) means for knowing the type and layout of a road, where said means also include at least one map, with these means configured to include the physical status of the road and entering of this data in the first processing means in such a way as to calculate the level of danger involved with driving depending on the condition of the road;
(vi) means for knowing the weather condition in which the vehicle is operating, configured so that the first processing means calculate the level of danger associated with driving depending on the weather conditions on the road;
(vii) means for recording the information obtained, as well as sending this information to third parties; configured for sharing the information collected with other similar systems located in nearby vehicles;

(viii) means for knowing the distance to nearby vehicles;
(ix) means for knowing the mechanical data of the vehicle;
(x) means for knowing the horizontal position of the system itself; and
(xi) means for knowing the relative position of the system inside the vehicle;
with said means connected and distributed in a bus that directly connects the means for detecting the type of driving with the means for processing the signal; and where said means are configured for providing the data obtained to the signal processing means in such a way to establish a degree of danger for driving and the inherent risk level for driving, displaying this information to the user in the means used for this purpose.

This invention provides the driver with the level of risk associated to a specific manoeuvre, taking into account the weather conditions and the condition of the road, since by assigning the degree of vehicle skid or turnover variable, the device will be able to know if the vehicle in question is in a danger zone and warn the driver of this risk condition; parallel to this, the invention can also combine the movement and speed data with a map that indicates the turn radius and provide a prior warning that the vehicle is travelling too fast to take the curve before reaching the curve, in this way anticipating before hand a possible turnover or skid of the vehicle, since it combines the speed of the vehicle with the turn radius listed on the map, the characteristics of the vehicle and its limits for safely driving during a turn. The same thing occurs with the routes that offer navigation devices, since these devices know what the route is going to be and, therefore, the curves that the driver must take in order to reach his destination. This way, the device, by knowing the speed of the vehicle and the curve that must be taken, can anticipate and may offer a degree of safety in the manoeuvre because if the vehicle is travelling at an excessive speed, it may even offer a different route and does not take into account the prior route, while simultaneously warning the driver of the danger involved with the manoeuvre.

BRIEF DESCRIPTION OF THE FIGURES

Following is a brief description of a series of drawings that help to better understand this invention and are precisely related to the embodiment of this invention, providing an illustrated example that is not intended to limit this invention.

PREFERRED EMBODIMENT OF THE INVENTION

Figure 1:
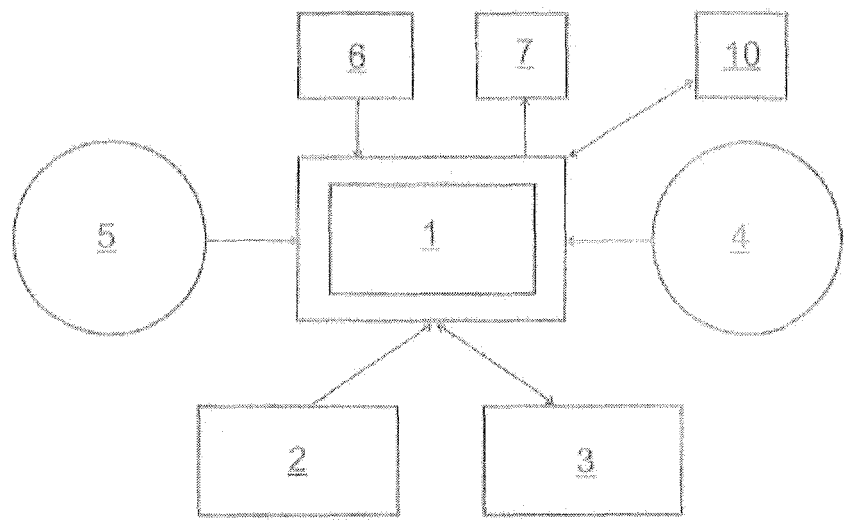
FIG. 1 shows a block diagram of the start detection system, purpose of this invention.
Figure 2:
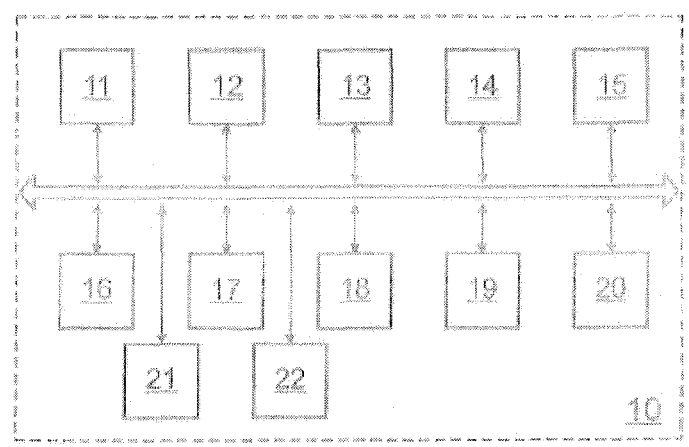
FIG. 2 shows a block diagram of the means for diagnosis of the driving (10), integral part of the system, purpose of this invention.

As can be observed in the attached figure, the start detection system, purpose of this invention, in this preferred embodiment includes at least the following:
(i) means for processing the signal (1), which centralizes all the signals from the different elements that make up the system;
(ii) adjustable means for timing (3);
(iii) adjustable vibration detection means (2);
(iv) an element for adjusting the sensitivity of the vibration means (5), in a way that enables the system to adapt to different types of vibrations; and
(v) an element for adjusting the timing means (4), for determining how much time the system must wait between vibrations and lack of vibrations in order to determine if the engine is running or is shutdown;
where the elements for adjusting the sensitivity of the vibration means (5) as well as the elements for adjusting the timing means (4) are required for reducing to the maximum the possible errors caused by vibrations generated by the wind, opening or closing of a door, etc.

This invention incorporates means for determining the type of driving (10), that may be displayed for the driver in real time or for third parties or make predictions regarding unsafe driving, which include:
(i) means for detecting lateral movements (11);
(ii) means for detecting longitudinal movements (12);
(iii) means for measuring the acceleration (13);
(iv) means for measuring the speed (14);
(v) means for knowing the type and layout of the road (15), for example a map
(vi) means for displaying the information for the driver (16) on a screen, by using voice or equivalent;
(vii) means for knowing the weather condition (17) in which the vehicle is travelling;
(viii) means for recording the information obtained as well as sending this information to third parties (18);
(ix) means for knowing the distance to nearby vehicles (19); and
(x) means for knowing the mechanical data of the vehicle (20);
(xi) means for knowing the horizontal position of the system itself (21); and
(xii) means for knowing the relative position of the system inside the vehicle (22);
where said means for diagnostics of the driving (10) are connected to the means for processing the signal (1).

The system implements a method for detecting vibrations that includes at least the following:
(i) first of all, the vehicle or machine is started and therefore begins to vibrate. The means for detecting vibrations (2) are triggered and the system waits a timeframe specified by the timing regulation means (4), and once this time has elapsed, the system considers the vehicle's engine to be running;
(ii) when the vehicle or machine stops vibrating; in other words, the engine is shutdown, the system waits a time set by the timing regulator (4) and will then consider the engine to be shutdown;
(iii) parallel to this, the signals originating from the means for detecting the type of driving (10) are analyzed, in such a way, that combining the information from said means with the vehicle's normal speed and acceleration characteristics, we can know the level of hazard associated with the driving in accordance with predefined limits;
(iv) parallel to this, the system may know the weather conditions as well as the condition of the road for the purpose of adding these variables to the device to provide the degree of danger for driving or the degree of driving smoothness to the driver as well as to third parties through a connection with the device. In this manner, the system can help the driver operate the vehicle by taking into account the specific aspects of the vehicle such as height, power, speed as well as external aspects such as the condition of the road, layout and weather conditions; and
(v) parallel to this, the device can be connected to the vehicle and may disable it or limit its speed from the vehicle's control centre.

(vi) parallel to this, the device may know the variables of the vehicle such as the RPMs, condition of the engine, turning of the wheel;
(vii) parallel to this, the device may know the distance to other nearby vehicles such as vehicles directly in front, behind or the vehicles that are located to its sides for the purpose of combining this data to offer predictions regarding the risk associated with the driving;
(viii) parallel to this, all this information may be recorded as a buffer and sent to third parties by any method like for example via radio;

As an option, the system may incorporate a GPS signal input (6) that may prove to be helpful, because if the GPS signal that is being received indicates the vehicle is moving, the system may then consider the engine to be running.

The system incorporates a means for providing electrical power that may vary depending on the type of vehicle or machine the system is installed in. Likewise, these means of electrical power provision are ones selected among the following:
photovoltaic cells;
wind generator;
use of vibrations by electromagnetic generation (faraday's law).

The invention claimed is:

1. A system for monitoring a status and driving of a vehicle carrying a load, the system comprising:
   a vibration detector having an adjustable sensitivity;
   a configurable timer; and
   diagnosing means for diagnosing a type of driving of a vehicle, said diagnosing means comprising:
      a lateral movement detector of the vehicle;
      a longitudinal movement detector of the vehicle;
      an accelerometer;
      a speedometer;
      a weather condition detector configured to detect a weather condition while the vehicle is moving;
      a memory configured to store
         a road layout including a map, and a physical condition of said road;
         data acquired by the lateral movement detector and the longitudinal movement detector;
         mechanical data of the vehicle;
         a relative position of the vehicle load inside the vehicle;
      a data transmitter configured to share the data collected by the lateral movement detector and the longitudinal movement detector with other systems located in nearby vehicles; and
      an inclinometer configured to provide a horizontal position of the vehicle load;
   wherein the system further comprises a processor configured to:
      calculate a distance to a nearby vehicle;
      establish the sensitivity for the vibration detector and a waiting time between vibrations via the timer;
      detect a start of the vehicle when
         the vibration detector detects a vibration,
         the timer is triggered,
         and the waiting time has elapsed;
      detect a stop of the vehicle when
         the vibration detector does not detect a vibration,
         the timer is triggered,
         and the waiting time has elapsed;
      analyze a degree of danger of the driving when the vehicle is started as a function of:
         an acceleration of the vehicle;
         a speed of the vehicle;
         the lateral movement of the vehicle;
         the longitudinal movement of the vehicle;
         the road layout;
         the weather condition;
         the distance to a nearby vehicle;
         the mechanical data of the vehicle;
         the horizontal position of the vehicle load; and
         the relative position of the vehicle load inside the vehicle; and
      inform a user of the vehicle of the degree of danger.

2. The system according to claim 1, further including a GPS signal coupled to the processor.

3. The system according to claim 1, wherein the processor is connected to the diagnosing means through a bus.

4. The system according to claim 1, wherein the vehicle load is coupled to an electronic control unit of the vehicle.

5. The system according to claim 4, wherein the electronic control unit is configured to disable the vehicle or limit the vehicle speed when the degree of danger exceeds a predefined threshold.

6. A method for monitoring a status and driving of a vehicle carrying a load comprising the steps of:
   calculating a distance to a nearby vehicle;
   establishing a sensitivity for a vibration detector, and a waiting time between vibrations via a timer;
   detecting a start of the vehicle when
      the vibration detector detects a vibration,
      the timer is triggered,
      and the waiting time has elapsed;
   detecting a stop of the vehicle when
      the vibration detector does not detect a vibration,
      the timer is triggered,
      and the waiting time has elapsed;
   analyzing a degree of danger of the driving when the vehicle is started as a function of:
      an acceleration of the vehicle;
      a speed of the vehicle;
      a lateral movement of the vehicle;
      a longitudinal movement of the vehicle;
      a layout of a road where the vehicle is located;
      a weather condition where the vehicle is located;
      the distance to a nearby vehicle;
      mechanical data of the vehicle;
      a horizontal position of the vehicle load; and
      a relative position of the vehicle load inside the vehicle; and
   informing a user of the vehicle of the degree of danger.

7. The method according to claim 6, further comprising the step of disabling the vehicle or limiting a speed of the vehicle when the degree of danger exceed a predefined threshold via an electronic control unit.

8. The method according to claim 6, further comprising the step of sharing the degree of danger with another vehicle.

* * * * *